(12) United States Patent
Kwon et al.

(10) Patent No.: US 11,699,831 B2
(45) Date of Patent: *Jul. 11, 2023

(54) SEPARATOR AND ELECTROCHEMICAL DEVICE COMPRISING SAME

(71) Applicant: LG ENERGY SOLUTION, LTD., Seoul (KR)

(72) Inventors: Hye-Jin Kwon, Daejeon (KR); In-Hyouk Sung, Daejeon (KR); Myeong-Soo Kim, Daejeon (KR); Su-Jin Yoon, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/893,362

(22) Filed: Aug. 23, 2022

(65) Prior Publication Data
US 2022/0407184 A1 Dec. 22, 2022

Related U.S. Application Data

(63) Continuation of application No. 16/629,218, filed as application No. PCT/KR2018/012363 on Oct. 18, 2018, now Pat. No. 11,469,476.

(30) Foreign Application Priority Data

Oct. 20, 2017 (KR) .......................... 10-2017-0136464

(51) Int. Cl.
*H01M 50/46* (2021.01)
*H01M 4/62* (2006.01)
(Continued)

(52) U.S. Cl.
CPC ......... *H01M 50/461* (2021.01); *H01M 4/622* (2013.01); *H01M 10/0525* (2013.01);
(Continued)

(58) Field of Classification Search
CPC ............ H01M 50/446; H01M 50/449; H01M 50/451; H01M 50/411; H01M 50/431; H01M 10/0525
See application file for complete search history.

(56) References Cited

U.S. PATENT DOCUMENTS 6,232,014 B1   5/2001  Shiota et al.
11,469,476 B2* 10/2022 Kwon ................ H01M 10/052
(Continued)

FOREIGN PATENT DOCUMENTS

CN   108058126 A   10/2015
CN   105659426 A   6/2016
(Continued)

OTHER PUBLICATIONS

Extended European Search Report for European Application No. 18867385.9, dated Oct. 30, 2020.
(Continued)

*Primary Examiner* — Jeremiah R Smith
(74) *Attorney, Agent, or Firm* — Birch, Stewart, Kolasch & Birch, LLP

(57) ABSTRACT

A separator which includes: a porous polymer substrate having a plurality of pores; a separator base including a porous coating layer formed on at least one surface of the porous polymer substrate; and an adhesive layer formed on at least one surface of the separator base, said adhesive layer comprising a plurality of second inorganic particles and adhesive resin particles, wherein the weight ratio of the second inorganic particles to the adhesive resin particles is 5:95-60:40, and the diameter of the adhesive resin particles is 1.1-3.5 times the diameter of the second inorganic particles. An electrochemical device including the separator is also disclosed. The separator shows improved adhesion between an electrode and the separator, maintains the pores of the adhesive layer even after a process of electrode
(Continued)

[After coating]

[After lamination]

lamination, and improves the resistance of an electrochemical device.

8 Claims, 2 Drawing Sheets

(51) Int. Cl.
    *H01M 10/0525*     (2010.01)
    *H01M 50/446*     (2021.01)
    *H01M 50/451*     (2021.01)
    *H01M 50/417*     (2021.01)
    *H01M 50/426*     (2021.01)
    *H01M 50/437*     (2021.01)
    *H01M 50/449*     (2021.01)
    *H01M 50/431*     (2021.01)
    *H01M 50/411*     (2021.01)

(52) U.S. Cl.
    CPC ....... *H01M 50/417* (2021.01); *H01M 50/446* (2021.01); *H01M 50/451* (2021.01); *H01M 50/411* (2021.01); *H01M 50/426* (2021.01); *H01M 50/431* (2021.01); *H01M 50/437* (2021.01); *H01M 50/449* (2021.01)

(56) References Cited

U.S. PATENT DOCUMENTS

| | | |
|---|---|---|
| 2008/0292968 A1 | 11/2008 | Lee et al. |
| 2009/0291360 A1 | 11/2009 | Kim et al. |
| 2013/0224558 A1 | 8/2013 | Kim et al. |
| 2013/0273407 A1 | 10/2013 | Kylyvnyk et al. |
| 2013/0316219 A1 | 11/2013 | Ha et al. |
| 2014/0248525 A1 | 9/2014 | Iwai et al. |
| 2014/0272532 A1 | 9/2014 | Park et al. |
| 2014/0322586 A1 | 10/2014 | Lee et al. |
| 2015/0140404 A1 | 5/2015 | Yoo et al. |
| 2016/0268565 A1 | 9/2016 | Sasaki et al. |
| 2016/0359155 A1 | 12/2016 | Hyun et al. |
| 2017/0149040 A1 | 5/2017 | Suzuki |
| 2017/0331094 A1 | 11/2017 | Lee et al. |
| 2018/0315971 A1 | 11/2018 | Kwon |
| 2019/0103593 A1 | 4/2019 | Kai |
| 2020/0127264 A1 | 4/2020 | Kim et al. |

FOREIGN PATENT DOCUMENTS

| | | |
|---|---|---|
| KR | 10-0727247 B1 | 6/2007 |
| KR | 10-0758482 B2 | 9/2007 |
| KR | 10-1341198 B1 | 12/2013 |
| KR | 10-1369326 B1 | 3/2014 |
| KR | 10-2014-0070484 A | 6/2014 |
| KR | 10-2014-0112384 A | 9/2014 |
| KR | 10-2016-0054936 A | 5/2016 |
| KR | 10-2017-0055440 A | 5/2017 |
| KR | 10-2017-0112250 A | 10/2017 |
| WO | WO 99/26307 A1 | 5/1999 |
| WO | WO 2016/064256 A1 | 4/2016 |

OTHER PUBLICATIONS

International Search Report (PCT/ISA/210) issued in PCT/KR2018/012363, dated Jan. 23, 2019.

* cited by examiner

[After coating]

[After lamination]

[After injection of electrolyte]

SEPARATOR AND ELECTROCHEMICAL DEVICE COMPRISING SAME

CROSS-REFERENCE TO RELATED APPLICATIONS

This application is a Continuation of copending application Ser. No. 16/629,218, filed on Jan. 7, 2020, which is the National Phase under 35 U.S.C. § 371 of International Application No. PCT/KR2018/012363, filed on Oct. 18, 2018, which claims the benefit under 35 U.S.C. § 119(a) to Patent Application No. 10-2017-0136464, filed in Korea on Oct. 20, 2017, all of which are hereby expressly incorporated by reference into the present application.

TECHNICAL FIELD

The present disclosure relates to a separator applicable to an electrochemical device, such as a lithium secondary battery, and an electrochemical device including the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles and a binder polymer onto at least one surface of a porous substrate having a plurality of pores.

Such a porous coating layer may be formed by using aqueous slurry including a particle-type binder polymer dispersed in an aqueous solvent or organic slurry including a non-particle type binder polymer dissolved in an organic solvent.

Particularly, when using aqueous slurry, there is an advantage in that the separator has significantly low resistance as compared to the separator using organic slurry.

However, when using aqueous slurry, the effect of phase separation between a solvent and a non-solvent is insufficient, unlike organic slurry. Thus, there is a problem in that the adhesion between an electrode and the separator is weak. Therefore, an additional adhesive layer has been introduced onto the porous coating layer formed by using aqueous slurry in some cases in order to increase the adhesion between the separator and the electrode.

However, when forming an adhesive layer on the porous coating layer formed by using aqueous slurry, the following problems occurred. In other words, although the separator itself had significantly lower resistance as compared to a separator using organic slurry, the battery obtained by interposing such a separator between an anode and a cathode and carrying out a lamination process under a high temperature/pressurized condition showed significantly higher resistance as compared to the battery using organic slurry. As a result, the battery provided poor output characteristics.

DISCLOSURE

Technical Problem

Therefore, the present disclosure is directed to providing a separator including a porous coating layer, having improved adhesion to an electrode, maintaining the pores of the adhesive layer after the lamination of an electrode, and showing an insignificant decrease in resistance.

The present disclosure is also directed to providing an electrochemical device provided with the separator.

Technical Solution

In one aspect of the present disclosure, there is provided a separator according to any one of the following embodiments.

According to the first embodiment of the present disclosure, there is provided a separator which includes:

a porous polymer substrate having a plurality of pores;

a separator base formed on at least one surface of the porous polymer substrate, said separator base including a porous coating layer containing a plurality of first inorganic particles and a binder polymer positioned on the whole or a part of the surface of the first inorganic particles to connect and fix the first inorganic particles with each other; and an adhesive layer formed on at least one surface of the separator base, said adhesive layer comprising a plurality of second inorganic particles and adhesive resin particles, wherein the weight ratio of the second inorganic particles to the adhesive resin particles is 5:95-60:40, and the diameter of the adhesive resin particles is 1.1-3.5 times a diameter of the second inorganic particles.

According to the second embodiment of the present disclosure, there is provided the separator as defined in the first embodiment, wherein the diameter of the adhesive resin particles is 1.2-3 times the diameter of the second inorganic particles.

According to the third embodiment of the present disclosure, there is provided the separator as defined in the first or the second embodiment, wherein the diameter of the adhesive resin particles is 1.2-1.3 times the diameter of the second inorganic particles.

According to the fourth embodiment of the present disclosure, there is provided the separator as defined in any one of the first to the third embodiments, wherein the second inorganic particles have an average particle diameter of 100 nm to 700 nm.

According to the fifth embodiment of the present disclosure, there is provided the separator as defined in any one of the first to the fourth embodiments, wherein the weight ratio of the first inorganic particles to the binder polymer is 90:10-99:1.

According to the sixth embodiment of the present disclosure, there is provided the separator as defined in any one of the first to the fifth embodiments, wherein the weight ratio of the second inorganic particles to the adhesive resin particles is 10:90-50:50.

According to the seventh embodiment of the present disclosure, there is provided the separator as defined in any one of the first to the sixth embodiments, wherein the binder polymer is any one selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a combination of two or more of them.

According to the eighth embodiment of the present disclosure, there is provided the separator as defined in any one of the first to the seventh embodiments, wherein the adhesive resin particle is any one selected from the group consisting of styrene butadiene rubber (SBR), acrylonitrile-butadiene rubber, acrylonitrile-butadiene-styrene rubber, polybutyl acrylate-co-methyl methacrylate, polyacrylonitrile, polyvinyl chloride, polyvinylidene fluoride, polyvinylalcohol, styrene and polycyanoacrylate, or a combination of two or more of them.

According to the ninth embodiment of the present disclosure, there is provided the separator as defined in any one of the first to the eighth embodiments, wherein the porous coating layer has a thickness of 1 µm to 10 µm and the adhesive layer has a thickness of 0.5 µm to 4 µm.

According to the tenth embodiment of the present disclosure, there is provided the separator as defined in any one of the first to the ninth embodiments, wherein the porous polymer substrate is a polyolefin-based porous polymer substrate.

In another aspect of the present disclosure, there is also provided an electrochemical device according to any one of the following embodiments.

According to the eleventh embodiment, there is provided an electrochemical device including a cathode, an anode and a separator interposed between the cathode and the anode, wherein the separator is the separator as defined in any one of the first to the tenth embodiments.

According to the twelfth embodiment, there is provided the electrochemical device according to the eleventh embodiment, wherein the electrochemical device is a lithium secondary battery.

Advantageous Effects

The separator according to an embodiment of the present disclosure includes inorganic particles in the adhesive layer formed on a porous coating layer, and thus maintains the pores of the adhesive layer even after it is subjected to a lamination process under high temperature/high pressure and shows a decreased increment in resistance.

In addition, it is possible to improve the adhesion between the separator and an electrode by controlling the content and size of the inorganic particles and those of the adhesive resin particles in the adhesive layer, while reducing an increment in resistance.

BEST MODE

Figure 1A:
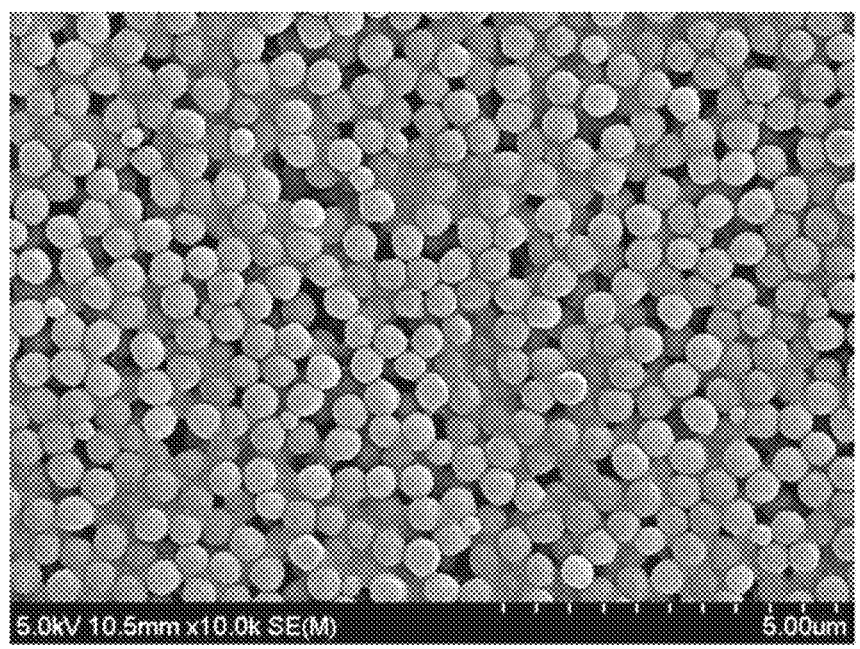
FIGS. 1a to 1c are scanning electron microscopic (SEM) images illustrating the surface of an adhesive layer according to comparative examples after coating the adhesive layer, after carrying out a lamination process and after injecting an electrolyte, respectively.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In the separator base including a porous polymer substrate and a porous coating layer on the porous polymer substrate according to the related art, an adhesive layer including an adhesive resin was applied and dried on the separator base in order to increase the adhesion between the separator base and an electrode.

When the separator having such an adhesive layer is subjected to a lamination process under a high temperature/pressurized condition, the battery has increased resistance after the process as compared to the resistance of the separator itself. The increment in resistance is higher in an adhesive layer formed by using slurry containing a particle type binder polymer dispersed in water, as compared to an adhesive layer formed by applying and drying organic slurry containing a binder polymer dissolved in an organic solvent.

Figure 1B:
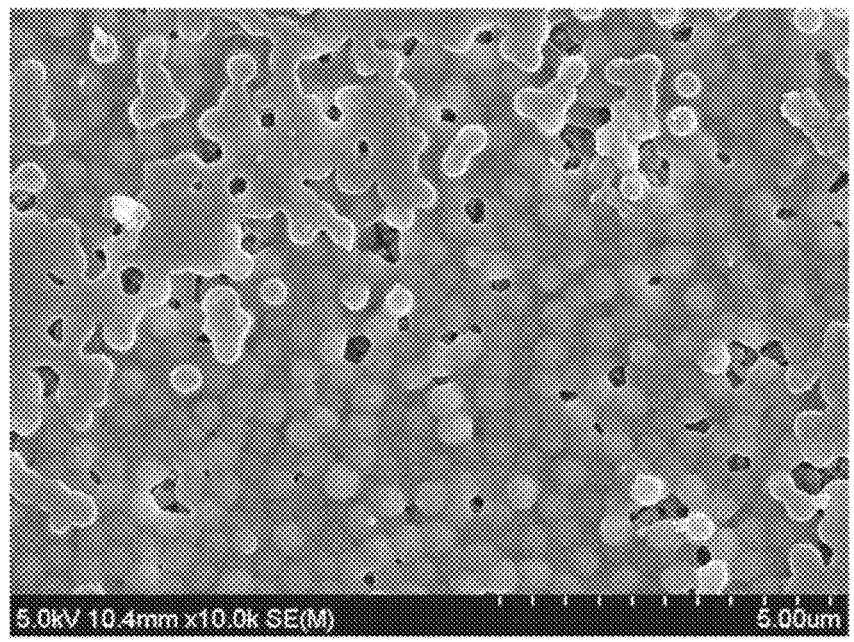
Figure 1C:
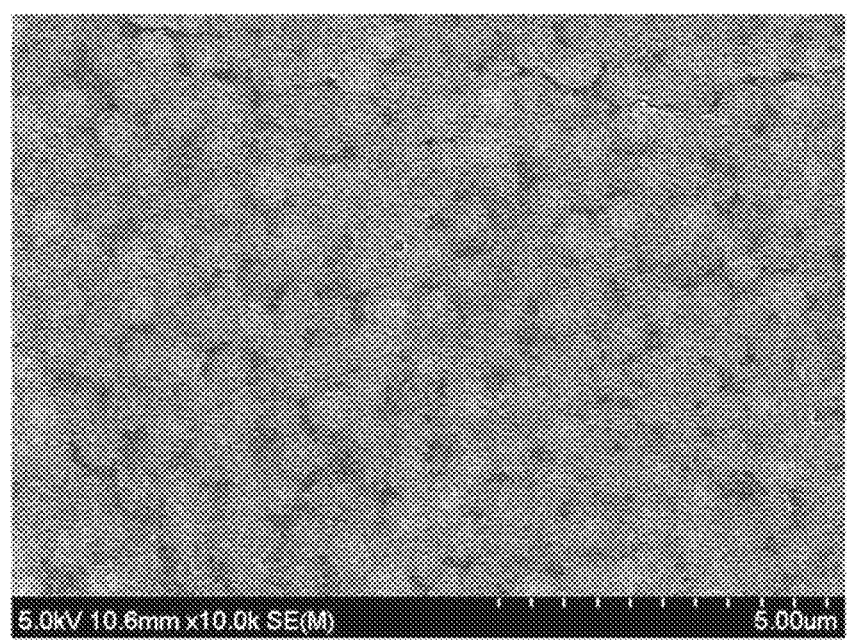

FIGS. 1a to 1c illustrate the above-mentioned problem. Hereinafter, this will be explained with reference to FIG. 1a. First, slurry containing adhesive resin particles (or a particle type binder polymer) dispersed in water is applied and dried on a separator base. Referring to FIG. 1a, it can be seen that the adhesive resin formed as described above has a particle shape. Since such adhesive resin particles perform spot adhesion, they show lower resistance before the lamination of an electrode as compared to an adhesive layer formed from organic slurry. For example, when aqueous slurry containing acrylic polymer particles dispersed in water is applied and dried on a separator base, the separator shows a resistance of about 0.92Ω. On the contrary, in the case of organic slurry, the separator has a resistance of about 1.66Ω. It is thought that the above results are derived from a difference between the adhesive resin particles performing spot adhesion and the non-particle type binder polymer performing surface adhesion.

Meanwhile, the separator including an adhesive layer formed from aqueous slurry containing adhesive resin particles shows a larger increment of battery resistance as compared to the separator using organic slurry, after carrying out an assemblage process of lamination. This is because the pores present originally among the adhesive resin particles disappear while the adhesive resin particles are partially molten. As a result, after injecting an electrolyte, the separator including the adhesive layer containing adhesive resin particles undesirably has higher resistance as compared to the separator including the adhesive layer formed by using organic slurry (FIG. 1c).

To solve the above-mentioned problem, the separator according to an embodiment of the present disclosure includes: a porous polymer substrate having a plurality of pores; a separator base formed on at least one surface of the porous polymer substrate, and including a porous coating layer containing a plurality of first inorganic particles and a binder polymer positioned on the whole or a part of the surface of the first inorganic particles to connect the first inorganic particles with each other and fix them; and an adhesive layer formed on at least one surface of the separator base and containing a plurality of second inorganic particles and adhesive resin particles, wherein the weight ratio of the second inorganic particles to the adhesive resin particles is 5:95-60:40, and the diameter of the adhesive resin particles is 1.1-3.5 times of the diameter of the second inorganic particles.

The separator according to an embodiment of the present disclosure includes the second inorganic particles and adhesive resin particles in the adhesive layer. Since the separator according to the present disclosure includes the second inorganic particles, the pores in the adhesive layer may be maintained even after a lamination process. In addition, it is possible to reduce the increment in resistance of the battery. It is thought that the above-mentioned effect is derived from the heat resistance of the second inorganic particles and high melting temperature thereof by which the second inorganic particles are not molten at the lamination processing temperature.

In the separator according to an embodiment of the present disclosure, the weight ratio of the second inorganic particles to the adhesive resin particles may be 5:95-60:40, preferably 10:90-50:50.

When the weight ratio of the second inorganic particles to the adhesive resin particles is within the above-defined range, the adhesion between an electrode and the separator is high, while the difference between the resistance of the separator itself and that of the battery after a lamination process is decreased. In other words, when the second inorganic particles are not present, the pores cannot be maintained after the lamination process as mentioned above, resulting in a problem of a rapid increase in the resistance of the battery. Meanwhile, when the content of the second inorganic particles is significantly larger than that of the adhesive resin particles, adhesion between an electrode and the separator is decreased and assemblage characteristics are degraded.

In the separator according to an embodiment of the present disclosure, the diameter of the adhesive resin particles may be 1.1-3.5 times, particularly 1.2-3 times, and more particularly 1.2-1.3 times of the diameter of the second inorganic particles. Herein, a diameter ratio of 1.2-1.3 is preferred for the use as a separator by virtue of high adhesion and a relatively low resistance value.

Even when the second inorganic particles and the adhesive resin particles maintain a specific weight ratio, the adhesion between an electrode and the separator may be decreased undesirably, when the adhesive resin particles have a diameter smaller than or equal to that of the second inorganic particles. Thus, the separator according to an embodiment of the present disclosure ensures high adhesion as well as low resistance of a battery by controlling the ratio of the diameter of the adhesive resin particles to that of the second inorganic particles as mentioned above. It is possible for the adhesive resin particles to ensure a sufficient area required for adhesion within the above-defined range, and thus to provide high adhesion between the adhesive layer surface and the porous coating layer or between the adhesive layer surface and the separator. It is also possible to form and maintain pores in the vacant spaces among the second inorganic particles and the adhesive resin particles, which is favorable in terms of resistance.

In the separator according to an embodiment of the present disclosure, the adhesive resin particles used for forming the adhesive layer are dispersed in the form of particles upon their dispersion in water or are present in an emulsion or suspension state. In addition, the adhesive resin particles have a particle shape upon drying.

According to an embodiment of the present disclosure, the adhesive resin particles may be any one selected from rubber, water-dispersible (meth)acrylic polymers, acrylic copolymers, polyacrylonitrile, polyvinyl chloride, polyvinylidene fluoride, polyvinyl alcohol, styrene and polycyanoacrylate, or a combination of two or more of them. Such adhesive resin particles have high adhesion and thus can bind inorganic particles among themselves even in a small content.

Non-limiting examples of the rubber that may be used herein include any one selected from the group consisting of styrene butadiene rubber (SBR), acrylonitrile-butadiene rubber and acrylonitrile-butadiene-styrene rubber, or a combination of two or more of them.

In addition, the water-dispersible (meth)acrylic polymer may be any one selected from the group consisting of polybutyl acrylate-co-methyl methacrylate, polyethyl acrylate, polyethyl methacrylate, polypropyl acrylate, polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate and polylauryl methacrylate, or a combination of two or more of them.

The acrylic copolymer may be a copolymer polymerized from butyl methacrylate and butyl acrylate at a molar ratio of 25:75-50:50.

The adhesive resin particles may have a core-shell structure. According to an embodiment of the present disclosure, the adhesive resin particles may include an acrylic copolymer of butyl acrylate with methyl methacrylate at the core portion and styrene at the shell portion.

According to an embodiment of the present disclosure, the adhesive resin particles may have an average diameter of 50-1200 nm, or 200-1100 nm. When the adhesive resin particles have an average diameter less than 50 nm, there are problems of degradation of dispersibility and adhesion between an electrode and a separator. When the adhesive resin particles have an average diameter larger than 1200 nm, there are problems of degradation of dispersibility and a difficulty in preparation of adhesive resin particles.

According to an embodiment of the present disclosure, when the porous polymer substrate has porous coating layers on both surfaces thereof, the adhesive layer may be formed on each top surface of the porous coating layer. In addition, when a porous coating layer is formed merely on one surface of the porous polymer substrate, the adhesive layer may be formed directly on the top surface of the porous coating layer and on the other surface of the porous polymer substrate having no porous coating layer.

According to an embodiment of the present disclosure, the adhesive layer may be formed on both surfaces of the separator base.

Particularly, the porous polymer substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous polymer nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

In addition, although there is no particular limitation in the thickness of the porous polymer substrate, the porous polymer substrate has a thickness of 1-100 μm, particularly 5-50 μm. Although there is no particular limitation in the size of the pores present in the porous polymer substrate and porosity, the pore size and porosity may be 0.01-50 μm and 0.1-95%, respectively.

The separator according to an embodiment of the present disclosure includes a separator base formed on at least one surface of the porous polymer substrate, and including a porous coating layer containing a plurality of first inorganic particles and a binder polymer positioned on the whole or a part of the surface of the first inorganic particles to connect the first inorganic particles with each other and fix them.

According to the present disclosure, there is no particular limitation in the first inorganic particles, as long as they are electrochemically stable. In other words, there is no particular limitation in the first inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the first inorganic particles, it is possible to improve the ion conductivity of an electrolyte by increasing the dissociation degree of an electrolyte salt, such as a lithium salt, in a liquid electrolyte.

For the above-mentioned reasons, the first inorganic particles may be inorganic particles having a dielectric constant of 5 or more, inorganic particles having lithium ion transportability or a combination thereof.

The inorganic particles having a dielectric constant of 5 or more may include any one selected from the group consisting of $Al_2O_3$, $SiO_2$, $ZrO_2$, ALOOH, $TiO_2$, $BaTiO_3$, $Pb(Zr,Ti)O_3$(PZT, wherein $0<x<1$), $Pb_{1-x}La_xZr_{1-y}Ti_yO_3$(PLZT, wherein $0<x<1$, $0<y<1$), $(1-x)Pb(Mg_{1/3}Nb_{2/3})O_3-xPbTiO_3$ (PMN-PT, wherein $0<x<1$), hafnia ($HfO_2$), $SrTiO_3$, $SnO_2$, $CeO_2$, MgO, NiO, CaO, ZnO, and SiC, or a mixture of two or more of them.

The inorganic particles having lithium ion transportability may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a combination of two or more of them.

In addition, there is no particular limitation in the average particle diameter of the first inorganic particles. However, the first inorganic particles preferably have an average particle diameter of 0.001-10 μm in order to form a coating layer with a uniform thickness and to provide suitable porosity. When the first inorganic particles have an average particle diameter less than 0.001 μm, they may show low dispersibility. When the first inorganic particles have an average particle diameter larger than 10 μm, the resultant coating layer may have an increased thickness.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the first inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the first inorganic particles to the binder polymer may be 90:10-99:1. When the weight ratio of the first inorganic particles to the binder polymer satisfies the above-defined range, the content of the binder polymer is increased to prevent a decrease in pore size and porosity of the resultant coating layer and to solve the problem of degradation of peeling resistance of the resultant coating layer caused by a decreased content of binder polymer.

Although there is no particular limitation in the thickness of the porous coating layer, the porous coating layer may have a thickness of 1-10 µm, particularly 1.5-6 µm. In addition, the porous coating layer preferably has a porosity of 35-65% but is not limited thereto.

The separator according to an embodiment of the present disclosure may further include other additives as ingredients of the porous coating layer, besides the first inorganic particles and binder polymer.

The separator according to an embodiment of the present disclosure includes an adhesive layer formed on at least one surface of the separator base and containing a plurality of second inorganic particles and adhesive resin particles.

The same specification as the first inorganic particles used for the porous coating layer may be applied to the second inorganic particles used for the adhesive layer according to the present disclosure. Non-limiting examples of the second inorganic particles used for the adhesive layer include any one selected from the group consisting of $Al_2O_3$, $SiO_2$, $ZrO_2$, AlOOH, $TiO_2$, $BaTiO_3$, $Pb(Zr,Ti)O_3$(PZT, wherein 0<x<1), $Pb_{1-x}La_xZr_{1-y}Ti_yO_3$(PLZT, wherein 0<x<1, 0<y<1), $(1-x)Pb(Mg_{1/3}Nb_{2/3})O_3-xPbTiO_3$ (PMN-PT, wherein 0<x<1), hafnia ($HfO_2$), $SrTiO_3$, $SnO_2$, $CeO_2$, MgO, NiO, CaO, ZnO, $ZO_3$ and SiC, or a mixture of two or more of them. The second inorganic particles may be the same as or different from the first inorganic particles for forming the porous coating layer.

The second inorganic particles may have a particle diameter of 100-700 nm, particularly 200-600 nm, and more particularly 250-500 nm. The above-defined range is preferred with a view to formation of an adhesive layer having a uniform thickness, suitable porosity and suitable thickness. The adhesive layer may have a thickness of 0.5-4 µm.

The separator according to an embodiment of the present disclosure may further include other additives as ingredients of the adhesive layer, besides the second inorganic particles and adhesive resin particles.

The separator according to an embodiment of the present disclosure may be obtained by the method including the steps of:

forming a porous coating layer containing a plurality of first inorganic particles and a binder polymer on at least one surface of a porous polymer substrate having a plurality of pores to prepare a separator base; and applying a dispersion including a plurality of second inorganic particles and adhesive resin particles dispersed in water onto at least one surface of the separator base, followed by drying, to form an adhesive layer, wherein the weight ratio of the second inorganic particles to the adhesive resin particles is 5:95-60:40, and the diameter of the adhesive resin particles is 1.1-3.5 times of the diameter of the second inorganic particles.

First, a composition for forming a porous coating layer may be obtained by dissolving a binder polymer into a solvent, adding the first inorganic particles thereto and dispersing them in order to form a porous coating layer. The first inorganic particles may be added after they are pulverized in advance to a predetermined average particle diameter. Otherwise, the first inorganic particles may be added to a binder polymer solution, and then pulverized and dispersed while controlling them to have a predetermined average particle diameter by using a ball milling process, or the like.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers on at least one surface of the porous substrate.

In the porous coating layers, the first inorganic particles are bound among themselves by the binder polymer while they are packed and are in contact with each other. Thus, interstitial volumes are formed among the first inorganic particles and the interstitial volumes become vacant spaces to form pores.

In other words, the binder polymer attaches the inorganic particles to each other so that they may retain their binding states. For example, the binder polymer connects and fixes the first inorganic particles with each other. In addition, the pores of the porous coating layer are those formed by the interstitial volumes among the first inorganic particles which become vacant spaces. The space may be defined by the inorganic particles facing each other substantially in a closely packed or densely packed structure of the first inorganic particles.

Herein, the solvent preferably has a solubility parameter similar to the solubility parameter of the binder polymer to be used and has a low boiling point. Non-limiting examples of the solvent that may be used include any one selected from alcohols having 2-5 carbon atoms, acetone, tetrahydrofuran, methylene chloride, chloroform, dimethyl formamide, N-methyl-2-pyrrolidone, methyl ethyl ketone and cyclohexane, or a combination of two or more of them.

Next, a dispersion including a plurality of second inorganic particles and adhesive resin particles dispersed in water is applied to at least one surface of the separator base, followed by drying, to form an adhesive layer.

Particularly, the adhesive resin particles are dispersed in water, and then the second inorganic particles are added thereto, followed by dispersion, to form a composition for forming an adhesive layer.

The same specification as the method for forming a porous coating layer may be applied to the method for forming an adhesive layer. Non-limiting examples of the method for forming an adhesive layer include slot coating or dip coating, which may be the same as or different from the method for forming a porous coating layer.

Then, the separator base coated with the composition for forming an adhesive layer is dried by using a dryer, such as an oven, to form an adhesive layer on at least one surface of the separator base.

The electrochemical device according to another embodiment of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

Artificial graphite, graphite, CMC and a binder (polyvinylidene fluoride, PVDF) were introduced to water at a weight ratio of 95.8:1:1.2:2 and mixed to obtain anode slurry. The resultant anode slurry were coated on copper (Cu) foil as an anode current collector with a capacity of 3.1 mAh/cm$^2$ to a thickness of 50 μm to form a thin electrode plate, which, in turn, was dried at 135° C. for 3 hours or more and then pressed to obtain an anode.

2) Manufacture of Cathode

LiCoO$_2$, a conductive material (carbon black) and a binder (PVDF) were introduced to N-methyl-2-pyrrolidone (NMP) at a weight ratio of 96:2:2 and mixed to obtain cathode slurry. The resultant cathode slurry was coated on aluminum foil with a capacity of 3.1 mAh/cm$^2$ to a thickness of 20 μm to obtain a cathode.

3) Manufacture of Separator Base

At room temperature, $Al_2O_3$ as the first inorganic particles (Japanese Light Metal Co., LS235, particle size 500 nm), carboxymethyl cellulose (CMC) as a dispersing agent, and the following binder polymer were introduced to water and agitated to prepare uniform dispersed slurry. The binder polymer was an acrylic copolymer polymerized from methyl methacrylate and ethylhexyl acrylate at a molar ratio of 25:75. In the slurry, the first inorganic particles and the binder polymer were used at a weight ratio of 95:5. The slurry was applied to one surface of a porous substrate by using a doctor blade and then dried to obtain a separator base having a porous coating layer. The porous coating layer had a thickness of 4 μm.

4) Adhesive Layer Coating

Slurry for forming an adhesive layer was applied to the surface of the separator base obtained from 3) and then dried to form an adhesive layer. The adhesive layer was prepared as follows. $Al_2O_3$ as the second inorganic particles and adhesive resin particles (LP11, Zeon, the adhesive resin particles are those provided with a core including polybutyl acrylate-co-methyl methacrylate and a shell including styrene) were dispersed in water homogeneously to prepare a slurry for forming an adhesive layer. In the slurry for forming an adhesive layer, the second inorganic particles and the adhesive resin particles were used at a weight ratio of 50:50. The slurry for forming an adhesive layer was applied to the porous coating layer of the separator base obtained from 3) in an amount of 1.0 g/m², and then dried to form an adhesive layer on the surface of the separator base. Herein, the second inorganic particles had a particle diameter of 500 nm, the adhesive resin particles had a particle diameter of 650 nm, and the ratio of the diameter of the binder polymer particles to that of the second inorganic particles was 1.3. The adhesive layer had a thickness of 2 μm.

5) Adhesion of Separator with Electrode

Then, the separator and an electrode were stacked successively so that the adhesive layer might face the anode active material layer of the electrode, and then pressing was carried out at a temperature of 90° C. under 8.5 MPa for 1 second to obtain an electrode assembly including a stack of the separator and anode.

Examples 2-6

Electrode assemblies were obtained in the same manner as described in Example 1, except that the weight ratio of the second inorganic particles to the adhesive resin particles and the diameter of the second inorganic particles and that of the adhesive resin particles in the slurry for forming an adhesive layer were changed according to the following Table 1.

TABLE 1

|  | Ex. 1 | Ex. 2 | Ex. 3 | Ex. 4 | Ex. 5 | Ex. 6 |
| --- | --- | --- | --- | --- | --- | --- |
| Content of the second inorganic particles (wt %) | 50 | 10 | 50 | 50 | 50 | 50 |
| Content of adhesive resin particles (wt %) | 50 | 90 | 50 | 50 | 50 | 50 |
| Diameter of the second inorganic particles (nm) | 500 | 500 | 250 | 500 | 250 | 250 |
| Diameter of adhesive resin particles (nm) | 650 | 650 | 300 | 1000 | 750 | 500 |
| Diameter of adhesive resin particles/Diameter of the second inorganic particles | 1.3 | 1.3 | 1.2 | 2 | 3 | 2 |
| Separator-anode adhesion (gf/15 mm) | 31 | 38 | 36 | 39 | 38 | 40 |
| Separator resistance (a) (Ω) (one sheet of separator) | 1.00 | 1.17 | 1.11 | 1.23 | 1.13 | 1.11 |
| Separator resistance after lamination (b) (Ω) (one sheet of separator + one sheet of anode) | 4.30 | 5.50 | 4.46 | 5.15 | 5.42 | 5.22 |
| Increment in resistance (%) ((b − a)/a * 100) | 330% | 370% | 302% | 360% | 380% | 370% |
| Thickness of porous coating layer + adhesive layer (μm) | 6 | 5.9 | 6 | 6.5 | 6.3 | 5.9 |
| Thickness of porous polymer substrate (μm) | 9 | 9 | 9 | 9 | 9 | 9 |
| Total thickness of separator (μm) | 15 | 14.9 | 15 | 15.5 | 15.3 | 14.9 |

Comparative Examples 1-11

Electrode assemblies were obtained in the same manner as described in Example 1, except that the weight ratio of the second inorganic particles to the adhesive resin particles, the diameter of the second inorganic particles and that of the adhesive resin particles in the slurry for forming an adhesive layer were changed according to the following Table 2.

TABLE 2

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Content of the second inorganic particles (wt %) | 0 | 70 | 50 | 50 | 50 | 50 |
| Content of adhesive resin particles (wt %) | 100 | 30 | 50 | 50 | 50 | 50 |
| Diameter of the second inorganic particles (nm) | — | 500 | 500 | 500 | 500 | 250 |
| Diameter of adhesive resin particles (nm) | 650 | 650 | 300 | 200 | 130 | 130 |
| Diameter of adhesive resin particles/Diameter of the second inorganic particles | — | 1.3 | 0.6 | 0.4 | 0.26 | 0.52 |
| Separator-anode adhesion (gf/15 mm) | 40 | 8 | 7 | 4 | 4 | 7 |
| Separator resistance (a) ($\Omega$) (one sheet of separator) | 1.20 | 0.85 | 1.07 | 0.80 | 1.04 | 1.10 |
| Separator resistance after lamination (b) ($\Omega$) (one sheet of separator + one sheet of anode) | 20.70 | 3.20 | 4.30 | 3.01 | 4.04 | 4.39 |
| Increment in resistance (%) ((b − a)/a * 100) | 1625% | 276% | 302% | 276% | 288% | 299% |
| Thickness of porous coating layer + adhesive layer ($\mu$m) | 5.8 | 6 | 6 | 5.9 | 6.2 | 6 |
| Thickness of porous polymer substrate ($\mu$m) | 9 | 9 | 9 | 9 | 9 | 9 |
| Total thickness of separator ($\mu$m) | 14.8 | 15 | 15 | 14.9 | 15.2 | 15 |
| Results | Deterioration of resistance after lamination | Failure in assemblage due to deterioration of adhesion | Failure in assemblage due to deterioration of adhesion | Failure in assemblage due to deterioration of adhesion | Failure in assemblage due to deterioration of adhesion | Failure in assemblage due to deterioration of adhesion |
|  | Comp. Ex. 7 | Comp. Ex. 8 | Comp. Ex. 9 | Comp. Ex. 10 | Comp. Ex. 11 |
| Content of the second inorganic particles (wt %) | 50 | 50 | 50 | 50 | 50 |
| Content of adhesive resin particles (wt %) | 50 | 50 | 50 | 50 | 50 |
| Diameter of the second inorganic particles (nm) | 500 | 500 | 250 | 1500 | 250 |
| Diameter of adhesive resin particles (nm) | 500 | 400 | 200 | 1000 | 1000 |
| Diameter of adhesive resin particles/Diameter of the second inorganic particles | 1.0 | 0.8 | 0.8 | 0.67 | 4 |
| Separator-anode adhesion (gf/15 mm) | 23 | 11 | 12 | 5 | 42 |
| Separator resistance (a) ($\Omega$) (one sheet of separator) | 0.97 | 0.92 | 1.05 | 1.54 | 1.14 |
| Separator resistance after lamination (b) ($\Omega$) (one sheet of separator + one sheet of anode) | 4.20 | 3.73 | 4.18 | 6.25 | 7.98 |
| Increment in resistance (%) ((b − a)/a * 100) | 333% | 305% | 298% | 306% | 600% |
| Thickness of porous coating layer + adhesive layer ($\mu$m) | 6 | 6.1 | 6.2 | 8.5 | 7.0 |
| Thickness of porous polymer substrate ($\mu$m) | 9 | 9 | 9 | 9 | 9 |
| Total thickness of separator ($\mu$m) | 15 | 15.1 | 15.2 | 17.5 | 16.0 |
| Results | Low adhesion | Low adhesion | Low adhesion | Failure in thin film coating due to large size of the second inorganic particles, high resistance, and failure in | Deterioration of resistance due to difficulty in ensuring space among particles |

TABLE 2-continued assemblage due
to deterioration
of adhesion

* Separator-anode lamination condition: 90° C., 8.5 MPa, 1 sec

Results of Evaluation

The thickness, particle diameter, separator-anode adhesion (gf/15 mm) and resistance of each of the electrode assemblies according to Examples 1-6 and Comparative Examples 1-11 were evaluated. The results are shown in Tables 1 and 2.

Particularly, the evaluation methods are as follows.

1) Determination of Separator-Anode Adhesion (Gf/15 mm)

An anode was obtained in the same manner as described in Example 1-1) and cut into a size of 15 mm×100 mm. Each of the separators according to Examples 1-6 and Comparative Examples 1-11 was cut into a size of 15 mm×100 mm. The prepared separator and anode were stacked successively, the resultant stack was inserted between PET films of 100 μm, and then adhesion was carried out by using a flat press. Herein, the flat press was used at 90° C. and 8.5 MPa under heating for 1 second. The end of the adhered separator and anode was mounted to a UTM instrument (LLOYD Instrument LF Plus) and the force required for separating the separator was determined by applying force in both directions at a rate of 300 mm/min.

2) Determination of Resistance

The resistance value upon dipping of each of the separators according to Examples 1-6 and Comparative Examples 1-11 in an electrolyte was determined at 25° C. through AC impedance analysis by using 1M LiPF$_6$-ethylene carbonate/ethyl methyl carbonate (weight ratio 3:7) as an electrolyte.

As shown in Table 1, in the case of each of Examples 1-6, the Lami strength is 30 gf/15 mm or more, suggesting a high adhesion to the electrode. In addition, the increment in resistance before and after the lamination with the electrode is approximately 300%, which is relatively lower as compared to Comparative Examples.

Meanwhile, as shown in Table 2, in the case of Comparative Example 1, the separator including no second inorganic particles in the adhesive layer particularly causes deterioration of resistance, as can be seen from an increment in resistance of 1625% before and after the lamination.

In the case of Comparative Example 2, the separator using the second inorganic particles and adhesive resin particles at a weight ratio of 70:30 causes a failure in adhesion between the separator and the electrode due to such a relatively high content of the second inorganic particles.

In the case of Comparative Examples 3-6, the separator having a ratio of diameter of the adhesive resin particles to that of the second inorganic particles less than 1 causes a failure in adhesion between the separator and the electrode.

In the case of Comparative Example 7, the separator using the second inorganic particles and adhesive resin particles having the same particle diameter cannot realize a sufficient effect in terms of adhesion and shows a relatively high increment in resistance before and after the lamination, and thus shows lower quality as compared to Examples.

In the case of Comparative Example 10, the separator using the second inorganic particles having a relatively large diameter of 1500 nm causes a failure in thin film coating. In addition, the separator shows a high resistance value and has relatively lower quality in terms of adhesion.

In the case of Comparative Example 11, the separator having a ratio of the diameter of adhesive resin particles to that of the second inorganic particles of 4 has a difficulty in ensuring a space among inorganic particles and/or adhesive resin particles, and thus causes deterioration of resistance.

What is claimed is:

1. A separator comprising:
   a porous polymer substrate having a plurality of pores;
   a separator base formed on at least one surface of the porous polymer substrate, said separator base comprising a porous coating layer comprising a plurality of first inorganic particles and a binder polymer positioned on a whole or a part of a surface of the first inorganic particles to connect and fix the first inorganic particles with each other; and
   an adhesive layer formed on at least one surface of the separator base, said adhesive layer comprising a plurality of second inorganic particles and adhesive resin particles,
   wherein a weight ratio of the second inorganic particles to the adhesive resin particles is 10:90-50:50, and
   a diameter of the adhesive resin particles is 1.2-3.0 times a diameter of the second inorganic particles,
   wherein the second inorganic particles have an average particle diameter of 250 nm to 500 nm.

2. The separator according to claim 1, wherein a weight ratio of the first inorganic particles to the binder polymer is 90:10-99:1.

3. The separator according to claim 1, wherein the binder polymer is any one selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a combination of two or more of them.

4. The separator according to claim 1, wherein the adhesive resin particle is any one selected from the group consisting of styrene butadiene rubber (SBR), acrylonitrile-butadiene rubber, acrylonitrile-butadiene-styrene rubber, polybutyl acrylate-co-methyl methacrylate, polyacrylonitrile, polyvinyl chloride, polyvinylidene fluoride, polyvinylalcohol, styrene and polycyanoacrylate or a combination of two or more of them.

5. The separator according to claim 1, wherein the porous coating layer has a thickness of 1 μm to 10 μm and the adhesive layer has a thickness of 0.5 μm to 4 μm.

6. The separator according to claim 1, wherein the porous polymer substrate is a polyolefin-based porous polymer substrate.

7. An electrochemical device comprising:
a cathode;
an anode; and
a separator interposed between the cathode and the anode,
wherein the separator is the separator as defined in claim 1.

8. The electrochemical device according to claim 7, wherein the electrochemical device is a lithium secondary battery.

\* \* \* \* \*